US010886951B2

(12) United States Patent
Nagumo et al.

(10) Patent No.: US 10,886,951 B2
(45) Date of Patent: Jan. 5, 2021

(54) FRONT-END MODULE

(71) Applicant: Murata Manufacturing Co., Ltd., Kyoto (JP)

(72) Inventors: Shoji Nagumo, Kyoto (JP); Kanta Motoki, Kyoto (JP); Keiji Hiejima, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 104 days.

(21) Appl. No.: 15/871,662

(22) Filed: Jan. 15, 2018

(65) Prior Publication Data

US 2018/0138927 A1    May 17, 2018

Related U.S. Application Data

(63) Continuation of application No. PCT/JP2016/062294, filed on Apr. 18, 2016.

(30) Foreign Application Priority Data

Jul. 17, 2015    (JP) .................................. 2015-143321

(51) Int. Cl.
| H04B 1/00 | (2006.01) |
| H04L 5/14 | (2006.01) |
| H04L 5/00 | (2006.01) |
| H04B 1/48 | (2006.01) |
| H04B 1/54 | (2006.01) |

(Continued)

(52) U.S. Cl.
CPC ........... *H04B 1/006* (2013.01); *H04B 1/0057* (2013.01); *H04B 1/0067* (2013.01); *H04B 1/48* (2013.01); *H04B 1/54* (2013.01); *H04L 5/001* (2013.01); *H04L 5/1469* (2013.01);
(Continued)

(58) Field of Classification Search
CPC combination set(s) only.
See application file for complete search history.

(56) References Cited

U.S. PATENT DOCUMENTS

2004/0189526 A1    9/2004    Frank
2013/0230080 A1    9/2013    Gudem et al.
(Continued)

FOREIGN PATENT DOCUMENTS

| CN | 103814526 A | 5/2014 |
| JP | 2004-304581 A | 10/2004 |

(Continued)

OTHER PUBLICATIONS

International Search Report for PCT/JP2016/062294 dated Jun. 28, 2016.
Written Opinion for PCT/JP2016/062294 dated Jun. 28, 2016.

*Primary Examiner* — Zhitong Chen
(74) *Attorney, Agent, or Firm* — Pearne & Gordon LLP

(57) ABSTRACT

A front-end module that uses a carrier aggregation scheme in which Band, which is selected from a low-frequency band group, and Band, which is selected from a high-frequency band group, are used simultaneously for communication includes a plurality of signal paths that connect a power amplifier module to an antenna element, and an antenna switch module that switches connection between the antenna element and the plurality of signal paths. Harmonics of Band have frequencies that are included in Band. The front-end module further includes a switch element disposed in a TDD transmission path.

12 Claims, 8 Drawing Sheets

(51) Int. Cl.
*H04B 1/3827* (2015.01)
*H04B 1/69* (2011.01)
*H04J 3/00* (2006.01)

(52) U.S. Cl.
CPC .............. *H04B 1/3833* (2013.01); *H04B 1/69* (2013.01); *H04J 3/00* (2013.01); *H04L 5/0023* (2013.01)

(56) References Cited

U.S. PATENT DOCUMENTS

| | | | | |
|---|---|---|---|---|
| 2014/0133103 | A1* | 5/2014 | Nakamura | H01L 23/3735 361/712 |
| 2014/0295775 | A1* | 10/2014 | Rousu | H04B 1/006 455/73 |
| 2014/0307592 | A1 | 10/2014 | Khlat | |
| 2014/0329475 | A1* | 11/2014 | Ella | H04B 1/006 455/77 |
| 2014/0376417 | A1 | 12/2014 | Khlat | |
| 2016/0285505 | A1* | 9/2016 | Lee | H04B 1/62 |

FOREIGN PATENT DOCUMENTS

| | | | | |
|---|---|---|---|---|
| JP | 2005-124119 A | | 5/2005 | |
| JP | 2005-269305 | * | 9/2005 | .............. H04B 1/40 |
| JP | 2005-269305 A | | 9/2005 | |
| JP | 2014-526847 A | | 10/2014 | |
| JP | 2015-041791 A | | 3/2015 | |

* cited by examiner

FRONT-END MODULE

This is a continuation of International Application No. PCT/JP2016/062294 filed on Apr. 18, 2016 which claims priority from Japanese Patent Application No. 2015-143321 filed on Jul. 17, 2015. The contents of these applications are incorporated herein by reference in their entireties.

BACKGROUND

Technical Field

The present disclosure relates to a front-end module that processes radio-frequency signals.

To support international roaming, improvements in communication speed, and so on, cellular phones are required to support a plurality of frequency bands and radio systems with single terminals (multi-band and multi-mode support).

Patent Document 1 discloses a circuit block diagram of a multi-band (3G/LTE (Long Term Evolution)) front-end module (FIG. 2). As illustrated in FIG. 2, a 3G/LTE system is separated into a high-frequency band group (HB: High Band group) and a low-frequency band group (LB: Low Band group). The high-frequency band group and the low-frequency band group are each provided with a radio-frequency switch (HB_SP10T and LB_SP7T) which is used to appropriately select a frequency band (band) for communication.

Furthermore, some of the current cellular phones include front-end modules capable of supporting 2G (GSM®(registered trademark) (Global System for Mobile communication)/EDGE (Enhanced Data rates for GSM® Evolution)) in addition to supporting 3G/LTE.

Patent Document 1: U.S. Patent Application Publication No. 2014/0307592

BRIEF SUMMARY

However, if a traditional multi-band, multi-mode front-end module is used in the so-called carrier aggregation (CA) scheme in which different frequency bands are used simultaneously, the following problems occur. A frequency band α in the high-frequency band group and a frequency band β in the low-frequency band group which are used simultaneously are based on an assumption that, for example, a harmonic component of a transmission signal in the frequency band β has a frequency that is substantially equal to the frequency of the fundamental of a reception signal in the frequency band α. In this case, the harmonic component is superimposed on the reception signal in the frequency band α, and as a result, the reception sensitivity for the reception signal is predicted to deteriorate.

Accordingly, the present disclosure has been made to solve the problems described above, and the present disclosure provides a front-end module capable of suppressing reduction in reception sensitivity in the carrier aggregation (CA) scheme.

A front-end module according to an aspect of the present disclosure is a front-end module that uses a carrier aggregation scheme in which a first frequency band selected from a first frequency band group having one or more frequency bands and a second frequency band selected from a second frequency band group having one or more frequency bands, the second frequency band group being allocated to a higher frequency region than the first frequency band group, are used simultaneously for communication. The front-end module includes a plurality of signal paths that connect an amplifier circuit which amplifies a transmission wave or a receiving circuit which performs signal processing on a reception wave to an antenna element, each of the plurality of signal paths being configured to selectively propagate a signal of a corresponding frequency band among a plurality of frequency bands, and an antenna switch module that switches connection between the antenna element and the plurality of signal paths by connecting the antenna element and at least one of the plurality of signal paths. At least one signal path among the plurality of signal paths is used for a time division duplex (TDD) scheme. A harmonic of a transmission signal of the first frequency band has a frequency that is included in the second frequency band. The front-end module further includes a switch element or filter element disposed in a TDD transmission path along which a transmission wave propagates among the at least one signal path used for the time division duplex scheme. The switch element or filter element blocks a component corresponding to the harmonic that propagates along the TDD transmission path.

Accordingly, in carrier aggregation in which signals of a first frequency band and a second frequency band are communicated simultaneously, when a transmission signal of the first frequency band is transmitted, the flow of a harmonic component of the transmission signal into a reception path for the second frequency band via a TDD transmission path can be reduced. Thus, the reduction in reception sensitivity for the second frequency band can be suppressed.

The TDD transmission path may be any one of a plurality of signal paths configured to selectively propagate signals of the one or more frequency bands included in the second frequency band group.

Accordingly, among TDD transmission paths on which a harmonic component of the transmission signal is superimposed with space and a substrate therebetween, the propagation of the harmonic component along a TDD transmission path for the second frequency band group that is closer to a reception path for the second frequency band is blocked. Thus, the reduction in reception sensitivity for the second frequency band can be most effectively suppressed.

A signal path configured to selectively propagate a signal of the first frequency band and a signal path configured to selectively propagate a signal of the second frequency band may be used for a frequency division duplex (FDD) scheme.

When an FDD transmission operation using the first frequency band and an FDD reception operation using the second frequency band are performed simultaneously, a harmonic component of a transmission signal of the first frequency band is likely to be superimposed on a reception signal of the second frequency band via a TDD transmission path. However, a switch element or filter element disposed in the TDD transmission path allows effective blocking of the harmonic component. Thus, the harmonic component to be superimposed on the second frequency band can be reduced, which enables suppression of reduction in reception sensitivity for the second frequency band.

One terminal of the switch element may be connected to the TDD transmission path on the amplifier circuit side, and another terminal of the switch element may be connected to the TDD transmission path on the antenna switch module side. In a mode in which the TDD transmission path is not used in a transmission operation, no continuity may be established between the one terminal and the other terminal such that the TDD transmission path is brought into an open state.

Thus, the switch element is inserted in series with the TDD transmission path. No continuity is established between both contacts of the switch element such that the TDD transmission path is brought into the open state, and continuity is established between both contacts of the switch element such that the TDD transmission path is brought into the pass-through state. Accordingly, no continuity is established across the switch element, which can prevent a harmonic component of the first frequency band to be superimposed on the TDD transmission path from reaching the antenna switch module. Thus, it is possible to suppress the flow of the harmonic components into the receiving circuit for the second frequency band.

Alternatively, one terminal of the switch element may be connected to the TDD transmission path, and another terminal of the switch element may be grounded. In a mode in which the TDD transmission path is not used in a transmission operation, continuity may be established between the one terminal and the other terminal such that the TDD transmission path is brought into a short-circuit state.

Thus, the switch element is inserted in parallel to the TDD transmission path. No continuity is established between both contacts of the switch element such that the TDD transmission path is brought into the pass-through state, and continuity is established between both contacts of the switch element such that the TDD transmission path is brought into the short-circuit state. Accordingly, continuity is established across the switch element, which can prevent a harmonic component of the first frequency band to be superimposed on the TDD transmission path from reaching the antenna switch module. Thus, it is possible to suppress the flow of the harmonic components into the receiving circuit for the second frequency band.

The filter element may be a low-pass filter or a band-stop filter that allows a transmission wave used in the time division duplex scheme to pass therethrough and that attenuates a signal having the component corresponding to the harmonic.

Accordingly, the flow of a harmonic component of the first frequency band into a reception path for the second frequency band via the TDD transmission path can be reduced without necessarily requiring switching operations at the timing when the TDD transmission path is used in a transmission operation and at the timing when the TDD transmission path is not used in a transmission operation. Thus, the circuit is simplified.

The front-end module may further include the amplifier circuit, the amplifier circuit being configured to amplify a signal whose transmission carrier wave lies in each of the one or more frequency bands included in the first frequency band group and the one or more frequency bands included in the second frequency band group.

Thus, a switch element or filter element to be disposed in the TDD transmission path can be optimized after the amplification characteristics of the amplifier circuit for the respective frequency bands are taken into account. Thus, the reduction in reception sensitivity for the second frequency band can be more effectively suppressed.

The antenna switch module may include a first substrate and a radio-frequency switch circuit chip on the first substrate to switch connection between the antenna element and the plurality of signal paths. The switch element or filter element may be formed as a separate chip from the radio-frequency switch circuit chip on the first substrate.

Accordingly, the radio-frequency switch circuit and the switch element or filter element are disposed on the same substrate, which can contribute to reduced space that a front-end area takes up. Furthermore, the radio-frequency switch circuit and the switch element or filter element are formed as separate chips, which enables enhanced isolation characteristics between them.

The amplifier circuit may include a second substrate and a power amplifier circuit chip on the second substrate to amplify a transmission wave. The switch element or filter element may be formed as a separate chip from the power amplifier circuit chip on the second substrate.

Accordingly, the power amplifier circuit and the switch element or filter element are disposed on the same substrate, which can achieve a reduction in the size of the front-end module. Furthermore, the power amplifier circuit and the switch element or filter element are formed as separate chips, which enables enhanced isolation characteristics between them.

The first frequency band may be Band 17 (transmission pass band: 704 to 716 MHz) conforming to an LTE (Long Term Evolution) standard, and the second frequency band may be Band 4 (reception pass band: 2110 to 2155 MHz) conforming to the LTE standard. The time division duplex scheme may be a GSM® (Global System for Mobile communication) scheme, and the TDD transmission path may be a path configured to propagate a transmission signal of GSM_HB (transmission pass band: 1710 to 1910 MHz). A third harmonic of a transmission signal of the first frequency band may have a frequency that substantially matches a frequency of a reception signal of the second frequency band.

Accordingly, in a multi-band/multi-mode system having LTE standard Band 4 and Band 17 supporting 3G/4G and GSM® supporting 2G, a carrier aggregation operation with suppressed reduction in reception sensitivity can be achieved.

A front-end module according to the present disclosure enables suppression of reduction in reception sensitivity in a carrier aggregation operation.

DETAILED DESCRIPTION

Figure 1:
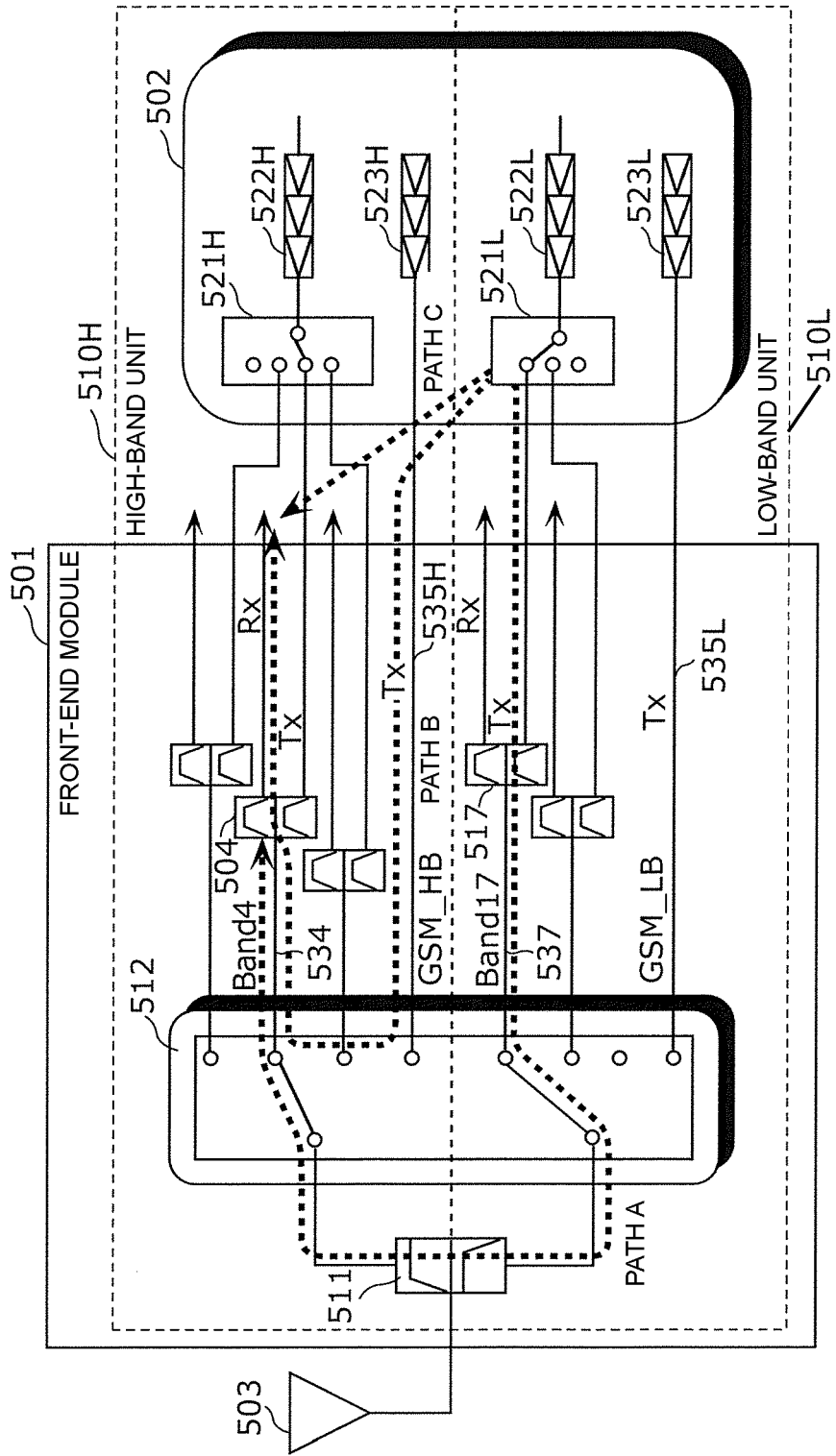
FIG. 1 is a circuit configuration diagram of a front-end module according to a comparative example.

In the following, embodiments of the present disclosure will be described in detail in conjunction with example implementations and corresponding figures. All of the example implementations described below illustrate general or specific examples. Values, shapes, materials, constituent elements, arrangements and connections of the constituent elements, and so on described in the following example implementations are examples and are not intended to limit the present disclosure. The constituent elements mentioned in the following example implementations are described as optional constituent elements unless they are specified in the independent claim. The dimensions or relative dimensions of each of the constituent elements in the drawings are not necessarily exact.

(1. Comparative Example)

Prior to the description of a front-end module according to an embodiment of the present disclosure, the problems found by the inventors concerning the front-end module mentioned in the Background Art section will be first described with reference to a comparative example.

FIG. 1 is a circuit configuration diagram of a front-end module according to a comparative example. In FIG. 1, a front-end module 501 according to the comparative example, a power amplifier module 502, and an antenna element 503 are illustrated. The front-end module 501, the power amplifier module 502, and the antenna element 503 are disposed at the front end of a multi-mode/multi-band cellular phone, for example.

The front-end module 501 includes a diplexer 511, an antenna switch module 512, a signal path 534 for selectively propagating a signal of Band 4 (transmission band: 1710 to 1755 MHz, reception band: 2110 to 2155 MHz) conforming to the LTE (Long Term Evolution) standard, a signal path 537 for selectively propagating a signal of Band 17 (transmission band: 704 to 716 MHz, reception band: 734 to 746 MHz) conforming to the LTE standard, a transmission signal path 535H for selectively propagating a transmission signal of GSM_HB (transmission band: 1710 to 1910 MHz), a transmission signal path 535L for selectively propagating a transmission signal of GSM_LB (transmission band: 824 to 915 MHz), and duplexers 504 and 517.

The front-end module 501 is provided with a plurality of signal paths for transmitting and receiving radio signals using a plurality of frequency bands so as to support multi-mode/multi-band. In this comparative example, the plurality of frequency bands are LTE standard Band 4 and Band 17 supporting 3G/4G and GSM® (GSM_HB and GSM_LB) supporting 2G. Signals whose carrier waves lie in Band 4 and Band 17 propagate along the signal paths 534 and 537, respectively, in accordance with a frequency division duplex (FDD) scheme. In contrast, transmission signals whose carrier waves lie in GSM_HB and GSM_LB propagate along the transmission signal paths 535H and 535L, respectively, in accordance with a time division duplex (TDD) scheme.

Since the signal paths 534 and 537 are used for signal processing based on the FDD scheme, the duplexers 504 and 517 are respectively disposed in the signal paths 534 and 537 to enable simultaneous transmission and reception. In contrast, since the transmission signal paths GSM_HB and GSM_LB are used for signal processing based on the TDD scheme, no duplexer is disposed in the transmission signal path GSM_HB or GSM_LB.

The signal paths 534 and 537 have transmission paths (Tx) connected to power amplifiers 522H and 522L in the power amplifier module 502 via radio-frequency switches 521H and 521L, respectively. The signal paths 534 and 537 have reception paths (Rx) connected to low noise amplifiers or reception signal processing circuits (not illustrated).

The transmission signal paths 535H and 535L for GSM_HB and GSM_LB are respectively connected to power amplifiers 523H and 523L in the power amplifier module 502. The front-end module 501 further includes reception signal paths for GSM_HB and GSM_LB, which are not illustrated in FIG. 1, and the reception signal paths are connected to the low noise amplifiers or the reception signal processing circuits.

The diplexer 511 splits a radio signal input from the antenna element 503 into a low-frequency band group (for example, 700 MHz to 1 GHz) or a high-frequency band group (for example, 1.7 GHz to 2.2 GHz) and outputs the radio signal to the antenna switch module 512. The diplexer 511 further outputs a transmission signal input from each signal path via the antenna switch module 512 to the antenna element 503.

The antenna switch module 512 connects the antenna element 503 to at least one of the plurality of signal paths described above to switch connection between the antenna element 503 and the plurality of signal paths. More specifically, the antenna switch module 512 includes a high-frequency input terminal and a low-frequency input terminal that are connected to the diplexer 511, and a plurality of output terminals each of which is connected to one of the plurality of signal paths. The high-frequency input terminal is exclusively connected to, for example, one of the signal path 534 for Band 4 and the transmission signal path 535H for GSM_HB. The low-frequency input terminal is exclusively connected to, for example, one of the signal path 537 for Band 17 and the transmission signal path 535L for GSM_LB. That is, the antenna switch module 512 may constitute a single-pole double-throw (SPDT) radio-frequency switch associated with each of the high-frequency band group and the low-frequency band group. For example, when the high-frequency band group or the low-frequency band group has n signal paths, the high-frequency band group or the low-frequency band group is provided with a single-pole n-throw (SPnT) radio-frequency switch.

In this embodiment, "connection" between two terminals means that a radio-frequency signal propagates between the two terminals without loss and is not limited to physical connection between the two terminals.

In the front-end module 501 and the power amplifier module 502, a circuit unit for processing signals of frequency bands belonging to the high-frequency band group is defined as a high-band unit 510H, and a circuit unit for processing signals of frequency bands belonging to the low-frequency band group is defined as a low-band unit 510L.

Here, the front-end module 501 according to the comparative example adopts the so-called carrier aggregation (CA) scheme, in which different frequency bands are used simultaneously, for the purpose of improved communication quality. That is, a second frequency band selected from one or more frequency bands belonging to the high-frequency band group and a first frequency band selected from one or more frequency bands belonging to the low-frequency band group are used simultaneously as carrier waves to perform communication. More specifically, in this comparative example, Band 4 belonging to the high-frequency band group and Band 17 belonging to the low-frequency band group are used simultaneously.

In this case, the following problem occurs.

In CA across Band 4 and Band 17, the third harmonic component of a transmission signal of Band 17 (transmission pass band: 704 to 716 MHz) has a frequency that is included in the reception band of Band 4 (reception pass band: 2110 to 2155 MHz). Because of this relationship, the third harmonic component of the transmission signal of Band 17 reaches the reception signal path for Band 4, which may cause large deterioration in reception sensitivity.

Here, main paths along which the third harmonic component of the transmission signal of Band 17 reaches the reception signal path for Band 4 include the following three paths.

Path A: The third harmonic component of the transmission signal of Band 17 that has been generated in the power amplifier 522L and the radio-frequency switch 521L propagates along the signal path 537 for Band 17 and reaches the reception signal path in the signal path 534 for Band 4 via the antenna switch module 512 and the diplexer 511.

Path B: The third harmonic component of the transmission signal of Band 17 that has been generated in the power amplifier 522L and the radio-frequency switch 521L moves to the transmission signal path 535H for GSM_HB within or near the power amplifier module 502, propagates along the transmission signal path 535H, propagates between output terminals of the antenna switch module 512, and reaches the reception signal path in the signal path 534 for Band 4.

Path C: The third harmonic component of the transmission signal of Band 17 that has been generated in the power amplifier 522L and the radio-frequency switch 521L moves directly to the reception signal path in the signal path 534 for Band 4.

In the path A out of the three paths, the duplexer 517 is disposed in the signal path 537 for Band 17. Thus, the frequency components other than the fundamental of Band 17 (704 to 716 MHz) are attenuated by the duplexer 517 before propagating into the antenna switch module 512. In addition, the third harmonic component of the transmission signal of Band 17 passes through the low pass filter side of the diplexer 511 and is thus further attenuated. A path from the signal path 537 to the diplexer 511 may also be provided with a low pass filter, if necessary, to ensure the desired attenuation.

In the path C out of the three paths, enhancement of shielding (GND) and optimization of the layout of components of the power amplifier module 502 and the signal path 534 for Band 4 make it possible to maximally suppress moving of the third harmonic component from the power amplifier module 502 to the signal path 534 for Band 4 outside the power amplifier module 502.

In the path B out of the three paths, however, the transmission signal path 535H for GSM_HB, in addition to the transmission signal path for Band 17, is also connected to the power amplifier module 502, which facilitates moving of the third harmonic component within or near the power amplifier module 502. In addition, no duplexer or SAW filter is disposed in the transmission signal path 535H for GSM_HB, which is based on the TDD scheme.

From the foregoing discussion, when the front-end module 501 according to the comparative example is subjected to a CA operation, the third harmonic component of a transmission signal of Band 17 belonging to the low-frequency band group reaches the reception signal path in the signal path 534 for Band 4 belonging to the high-frequency band group via any one of the paths A to C. Above all, the third harmonic component reaching the reception signal path for Band 4 via the path B is found to be the greatest cause of deterioration in reception sensitivity of Band 4.

The present disclosure has been made in order to solve the problems described above, and the present disclosure provides a front-end module capable of suppressing reduction in reception sensitivity in the carrier aggregation scheme.

The following description provides an example implementation of the front-end module of the present disclosure.

(2. Example Implementation)

[2.1 Configuration of Front-End Module according to Example Implementation]

Figure 2:
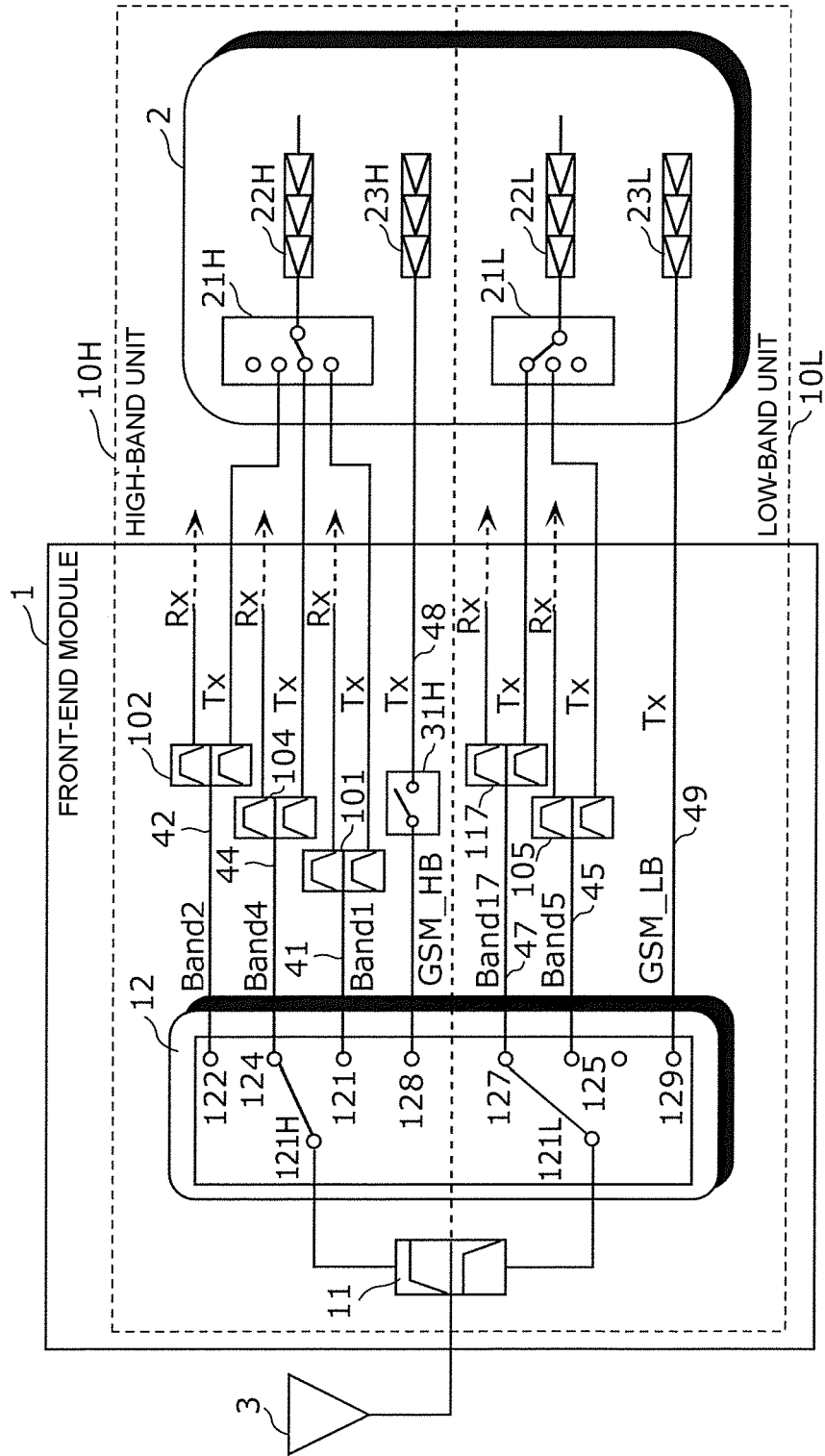
FIG. 2 is a circuit configuration diagram of a front-end module according to an example implementation.

FIG. 2 is a circuit configuration diagram of a front-end module according to an example implementation. In FIG. 2, a front-end module 1 according to an example implementation, a power amplifier module 2, and an antenna element 3 are illustrated. The front-end module 1, the power amplifier module 2, and the antenna element 3 are disposed at the front end of a multi-mode/multi-band cellular phone, for example.

The front-end module 1 includes a diplexer 11, an antenna switch module 12, a signal path 41 for selectively propagating a signal of Band 1 (transmission band: 1920 to 1980 MHz, reception band: 2110 to 2170 MHz) conforming to the LTE standard, a signal path 42 for selectively propagating a signal of Band 2 (transmission band: 1850 to 1910 MHz, reception band: 1930 to 1990 MHz) conforming to the LTE standard, a signal path 44 for selectively propagating a signal of Band 4 (transmission band: 1710 to 1755 MHz, reception band: 2110 to 2155 MHz) conforming to the LTE standard, a signal path 47 for selectively propagating a signal of Band 17 (transmission band: 704 to 716 MHz, reception band: 734 to 746 MHz) conforming to the LTE standard, a signal path 45 for selectively propagating a signal of Band 5 (transmission band: 824 to 849 MHz, reception band: 869 to 894 MHz) conforming to the LTE standard, a transmission signal path 48 for selectively propagating a transmission signal of GSM_HB (transmission band: 1710 to 1910 MHz), a transmission signal path 49 for selectively propagating a transmission signal of GSM_LB (transmission band: 824 to 915 MHz), a switch element 31H, and duplexers 101, 102, 104, 105, and 117.

The front-end module 1 is a multi-carrier transceiver device including a plurality of signal paths for transmitting and receiving radio signals using a plurality of frequency bands in order to support multi-mode/multi-band. In this example implementation, the plurality of frequency bands are LTE standard Bands 1, 2, 4, 5, and 17 supporting 3G/4G and GSM (GSM_HB and GSM_LB) supporting 2G. Signals whose carrier waves lie in Bands 1, 2, 4, 5, and 17 propagate along the signal paths 41, 42, 44, 45, and 47, respectively, in accordance with a frequency division duplex (FDD) scheme. In contrast, transmission signals whose carrier waves lie in GSM_HB and GSM_LB propagate along the transmission signal paths 48 and 49, respectively, in accordance with a time division duplex (TDD) scheme.

Since the signal paths 41, 42, 44, 45, and 47 are used for signal processing based on the FDD scheme, the duplexers 101, 102, 104, 105, and 117 are respectively disposed in the signal paths 41, 42, 44, 45, and 47 to enable simultaneous transmission and reception. In contrast, since the transmission signal paths GSM_HB and GSM_LB are used for signal processing based on the TDD scheme, no duplexer is disposed in the transmission signal path GSM_HB or GSM_LB.

The signal paths 41, 42, and 44 have transmission paths (Tx) connected to a power amplifier 22H in the power amplifier module 2 via a radio-frequency switch 21H. The signal paths 45 and 47 have transmission paths (Tx) connected to a power amplifier 22L in the power amplifier module 2 via a radio-frequency switch 21L. The signal paths 41, 42, 44, 45, and 47 have reception paths (Rx) connected to low noise amplifiers or reception signal processing circuits (not illustrated). The low noise amplifiers and the reception signal processing circuits form receiving circuits that perform signal processing on reception waves.

The transmission signal paths 48 and 49 for GSM_HB and GSM_LB are respectively connected to power amplifiers 23H and 23L in the power amplifier module 2. The front-end module 1 further includes reception signal paths for GSM_HB and GSM_LB, which are not illustrated in FIG. 2. The reception signal paths are connected to the low noise amplifiers or the reception signal processing circuits.

Here, the front-end module 1 according to this example implementation adopts the so-called carrier aggregation scheme, in which different frequency bands are used simultaneously, for the purpose of improved communication quality (high-speed and stable communication). That is, a second frequency band selected from one or more frequency bands belonging to the high-frequency band group and a first frequency band selected from one or more frequency bands belonging to the low-frequency band group are used simultaneously as carrier waves to perform communication. More specifically, in this example implementation, Band 4 belonging to the high-frequency band group and Band 17 belonging to the low-frequency band group are used simultaneously.

Bands 17 and 5 and GSM_LB are frequency bands belonging to a first frequency band group, and Bands 1, 2, and 4 and GSM_HB are frequency bands belonging to a second frequency band group allocated to a higher frequency region than the first frequency band group. The first frequency band group is a low-frequency band group including one or more frequency bands that include Band 17, which is used in the CA operation. The second frequency band group is a high-frequency band group including one or more frequency bands that include Band 4, which is used in the CA operation, and GSM_HB, which is used in the TDD operation (not used in the CA operation). In this example implementation, at least one signal path among a plurality of signal paths along which signals of a plurality of frequency bands included in the high-frequency band group propagate is used in the TDD scheme.

The diplexer 11 splits a radio signal input from the antenna element 3 into the low-frequency band group (for example, 700 MHz to 1 GHz) or the high-frequency band group (for example, 1.7 GHz to 2.2 GHz) and outputs the radio signal to the antenna switch module 12. The diplexer 11 further outputs a transmission signal input from each signal path via the antenna switch module 12 to the antenna element 3.

The antenna switch module 12 connects the antenna element 3 to at least one signal path among the plurality of signal paths described above to switch connection between the antenna element 3 and the plurality of signal paths. More specifically, the antenna switch module 12 includes a high-frequency input terminal 121H and a low-frequency input terminal 121L that are connected to the diplexer 11, and a plurality of output terminals 122, 124, 121, 128, 127, 125, and 129, each of which is connected to one of the plurality of signal paths. The high-frequency input terminal 121H is exclusively connected to one of the signal paths 41, 42, and 44 for Bands 1, 2, and 4 or the transmission signal path 48 for GSM_HB. The low-frequency input terminal 121L is exclusively connected to one of the signal paths 47 and 45 for Bands 17 and 5 or the transmission signal path 49 for GSM_LB. That is, the antenna switch module 12 constitutes a single-pole four-throw (SP0T) radio-frequency switch associated with the high-frequency band group, and a single-pole three-throw (SP3T) radio-frequency switch associated with the low-frequency band group. For example, when the high-frequency band group or the low-frequency band group has n signal paths, the high-frequency band group or the low-frequency band group is provided with a single-pole n-throw (SPnT) radio-frequency switch.

In the front-end module 1 and the power amplifier module 2, a circuit unit for processing signals of frequency bands belonging to the high-frequency band group is defined as a high-band unit 10H, and a circuit unit for processing signals of frequency bands belonging to the low-frequency band group is defined as a low-band unit 10L.

The switch element 31H is disposed in the transmission signal path 48 for GSM_HB, which is a TDD transmission path included in the high-band unit 10H. The switch element 31H has one terminal connected to the transmission signal path 48 on the power amplifier module 2 side, and another terminal connected to the transmission signal path 48 on the antenna switch module 12 side. In this connection configuration, no continuity is established between the one terminal and the other terminal in a mode in which GSM_HB is not used in a transmission operation, and continuity is established between the one terminal and the other terminal in a mode in which GSM_HB is used in a transmission operation. Thus, the transmission signal path 48 is in an open state in the mode in which GSM_HB is not used in a transmission operation, and the transmission signal path 48 is in a pass-through state in the mode in which GSM_HB is used in a transmission operation.

In this example implementation, the third harmonic component of a transmission signal (704 to 716 MHz) of Band 17 (first frequency band) has a frequency that is included in the reception band (2110 to 2155 MHz) for Band 4 (second frequency band). In other words, the third harmonic component of a transmission signal of Band 17 (first frequency band) has a frequency that substantially matches the frequency of a reception signal of Band 4 (second frequency band). That is, a harmonic of the transmission signal of the first frequency band has a frequency that is included in the second frequency band. Due to this frequency relationship, the third harmonic component of the transmission signal of Band 17, which has been generated in the power amplifier 22L and the radio-frequency switch 21L, is likely to move to the transmission signal path 48 for GSM_HB within or near the power amplifier module 2.

However, the front-end module 1 according to this example implementation includes the switch element 31H in the transmission signal path 48 to block the component corresponding to the third harmonic component. The switch element 31H is in an open state in the mode in which GSM_HB is not used in a transmission operation, in other words, in a mode in which Bands 4 and 17 are used in a CA operation. This can prevent the third harmonic component that moves into the transmission signal path 48 from reaching the antenna switch module 12 via the transmission signal path 48. Thus, it is possible to suppress the flow of the third harmonic component into the reception signal path for Band 4.

The front-end module 1 according to this embodiment may further include the power amplifier module 2. The power amplifier module 2 includes the power amplifiers 22H, 23H, 22L, and 23L and the radio-frequency switches 21H and 21L. The power amplifier 22H amplifies transmission signals of Bands 1, 2, and 4, and the power amplifier 23H amplifies a transmission signal of GSM_HB. The power amplifier 22L amplifies transmission signals of Bands 17 and 5, and the power amplifier 23L amplifies a transmission signal of GSM_LB. The radio-frequency switch 21H exclusively connects the power amplifier 22H to any one of the signal paths 41, 42, and 44, and the radio-frequency switch 21L exclusively connects the power amplifier 22L to any one of the signal paths 47 and 45. The power amplifier module 2 is a multi-mode/multi-band (MMMB) amplifier circuit that amplifies a transmission signal (transmission wave) whose transmission carrier wave lies in each of a plurality of frequency bands.

The power amplifier module 2 is included in the front-end module 1 to form a single unit. With this configuration, the switch element 31H (or a filter element) to be disposed in the transmission signal path 48 can be optimized after being matched to the characteristics of a power amplifier that amplifies transmission signals of the respective frequency bands. Thus, the reduction in reception sensitivity of Band 4 can be more effectively suppressed.

[2.2 Effects of Front-End Module according to Example Implementation]

Next, the effects of the front-end module 1 according to this example implementation will be described.

Figure 3:
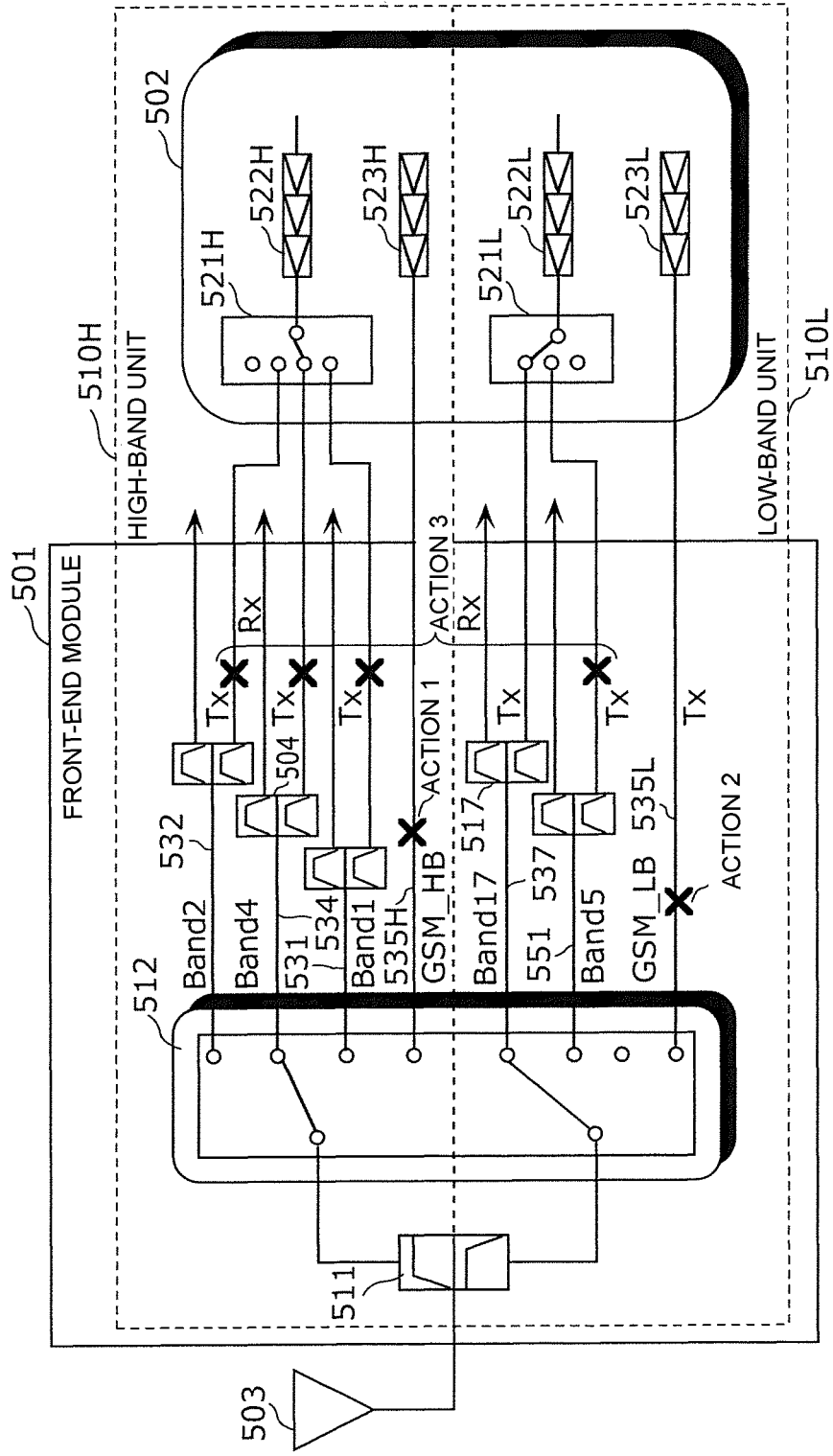
FIG. 3 is a diagram depicting step-by-step actions to be taken for harmonic blocking in the front-end module.

FIG. 3 is a diagram depicting step-by-step actions to be taken for harmonic blocking in a front-end module. To describe the effects of the front-end module 1 according to this example implementation, a quantitative evaluation of reception sensitivity of Band 4 when the signal paths in the front-end module 501 according to the comparative example are blocked step by step was carried out.

The quantitative evaluation of reception sensitivity of Band 4 was carried out using the difference sensitivity (S1-S2) (dB) between the reception sensitivity S1 (dBm) for Band 4 which was obtained when a transmission signal of Band 17 was transmitted at maximum power and the reception sensitivity S2 (dBm) for Band 4 which was obtained when a transmission signal of Band 17 was transmitted at minimum power. The reception sensitivity S2 for Band 4 which is obtained when a transmission signal of Band 17 is transmitted at minimum power substantially meets the required reception sensitivity. In contrast, the reception sensitivity S1 for Band 4 which is obtained when a transmission signal of Band 17 is transmitted at maximum power deteriorates due to the third harmonic component of Band 17 described above (the reception sensitivity S1 becomes higher than the required reception sensitivity).

First, when no signal path was blocked in the front-end module 501 according to the comparative example, the difference sensitivity (S1-S2) was 13.9 dB.

Then, in the front-end module 501 according to the comparative example, the transmission signal path 48 for GSM_HB was blocked midway (action 1). In this case, the difference sensitivity (S1-S2) was 2.6 dB.

Then, in addition to action 1 described above, the transmission signal path 49 for GSM_LB was blocked midway (action 2). In this case, the difference sensitivity (S1-S2) was 1.9 dB.

Finally, in addition to action 1 and action 2 described above, the transmission signal path for Band 1, the transmission signal path for Band 2, and the transmission signal path for Band 4 were blocked midway (action 3). In this case, the difference sensitivity (S1-S2) was 1.5 dB.

From the measurement results described above, the degree of contribution to suppression of deterioration in reception sensitivity can be determined to be 11.3 dB (=13.9 dB−2.6 dB) when the transmission signal path 48 for GSM_HB is blocked midway. Furthermore, when the transmission signal path 49 for GSM_LB is blocked midway, the degree of contribution to suppression of deterioration in reception sensitivity can be determined to be 0.7 dB (=2.6 dB−1.9 dB). Furthermore, when the respective FDD transmission signal paths are blocked midway, the degree of contribution to suppression of deterioration in reception sensitivity can be determined to be 0.4 dB (=1.9 dB−1.5 dB).

That is, out of actions 1 to 3 described above, blocking the transmission signal path 48 for GSM_HB midway can be determined to be most effective to suppress deterioration in reception sensitivity.

In accordance with the results of the examination described above, the front-end module 1 according to this example implementation is provided with the switch element 31H in the transmission signal path 48 to achieve a configuration in which action 1 is taken. Accordingly, when a transmission signal of Band 17 is transmitted in carrier aggregation in which signals of Band 17 (first frequency band) and Band 4 (second frequency band) are communicated simultaneously, the flow of the third harmonic component of the transmission signal into the reception path for Band 4 via the transmission signal path 48 for GSM_HB can be most effectively reduced. Thus, the reduction in reception sensitivity for a frequency band belonging to the high-frequency band group can be most effectively suppressed.

From the results of action 2 described above, a switch element or a filter element may be disposed in the transmission signal path 49 for GSM_LB to block the third harmonic component of Band 17. In this case, whereas the degree of contribution to suppression of deterioration in reception sensitivity is lower than that when the switch element 31H is disposed in the transmission signal path 48, the reduction in reception sensitivity for a frequency band belonging to the high-frequency band group can be suppressed.

In addition, a switch element or a filter element is disposed in each of the transmission signal path 48 for GSM_HB and the transmission signal path 49 for GSM_LB, which enables further suppression of deterioration in reception sensitivity.

[2.3 Modifications of Switch Element or Filter Element]

The switch element included in the front-end module 1 according to this embodiment is not limited to that in the configuration described above.

Figure 4A:
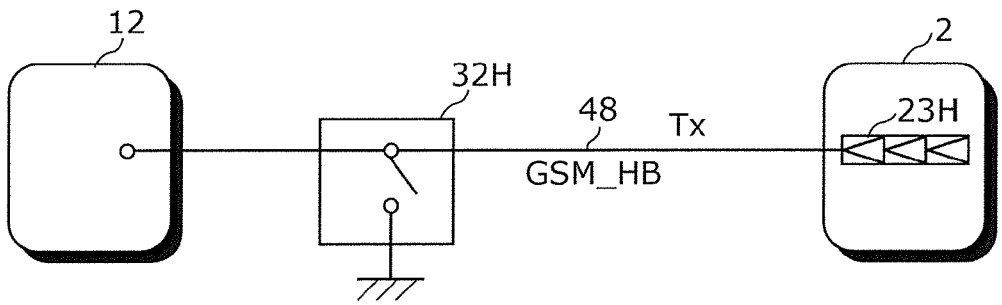
FIG. 4A is a diagram illustrating a configuration of a switch element according to Modification 1.

FIG. 4A is a diagram illustrating a configuration of a switch element 32H according to Modification 1 of the embodiment. The switch element 32H is disposed in the transmission signal path 48 for GSM_HB, which is a TDD transmission path. The switch element 32H has one terminal connected to the transmission signal path 48, and another terminal grounded. In this connection configuration, continuity is established between the one terminal and the other terminal in a mode in which GSM_HB is not used in a transmission operation, and no continuity is established between the one terminal and the other terminal in a mode in which GSM_HB is used in a transmission operation. Accordingly, the transmission signal path 48 is in a short-circuit state in the mode in which GSM_HB is not used in a transmission operation, in other words, in a mode in which Bands 4 and 17 are used in a CA operation, and the transmission signal path 48 is in a pass-through state in the mode in which GSM_HB is used in a transmission operation. This can prevent the third harmonic component that moves into the transmission signal path 48 from reaching the antenna switch module 12 via the transmission signal path 48. Thus, it is possible to suppress the flow of the third harmonic component into the reception signal path for Band 4.

The element disposed in the transmission signal path 48 for GSM_HB in the front-end module 1 according to this embodiment to block the third harmonic component is not necessarily a switch element.

Figure 4B:
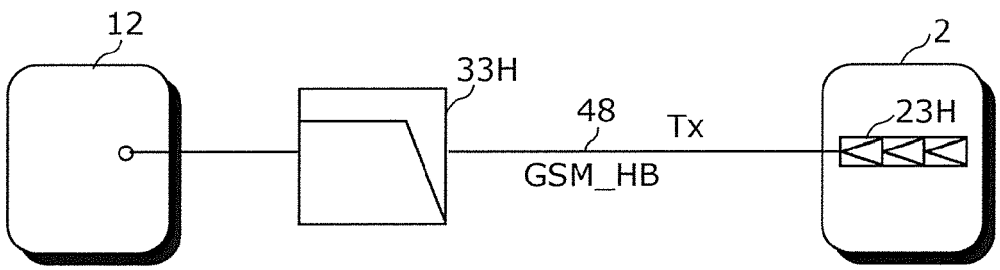
FIG. 4B is a diagram illustrating a configuration of a filter element according to Modification 2.

FIG. 4B is a diagram illustrating a configuration of a filter element 33H according to Modification 2 of the embodiment. The filter element 33H is disposed in the transmission signal path 48 for GSM_HB, which is a TDD transmission path, and may be a low-pass filter (or a band pass filter) that allows a transmission signal of GSM_HB (1710 to 1910 MHz) to pass therethrough and that attenuates the third harmonic component of Band 17 (2112 to 2148 MHz).

Accordingly, the flow of the third harmonic component of Band 17 into the reception path for Band 4 via the transmission signal path 48 can be reduced without necessarily requiring switching operations at the timing when the transmission signal path 48 for GSM_HB is used in a transmission operation and at the timing when the transmission signal path 48 for GSM_HB is not used in a transmission operation. Thus, the circuit is simplified.

The configuration of the filter element included in the front-end module 1 according to this example implementation is not limited to that described above.

Figure 4C:
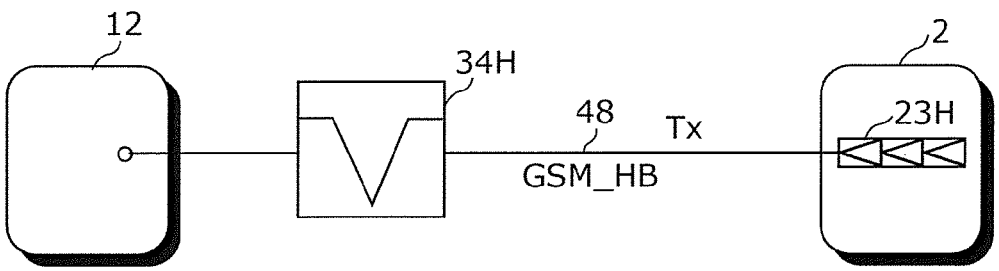
FIG. 4C is a diagram illustrating a configuration of a filter element according to Modification 3.

FIG. 4C is a diagram illustrating a configuration of a filter element 34H according to Modification 3 of the embodiment. The filter element 34H is disposed in the transmission signal path 48 for GSM_HB, which is a TDD transmission path, and may be a band-stop filter that allows a transmission signal of GSM_HB (1710 to 1910 MHz) to pass therethrough and that attenuates a signal (2112 to 2148 MHz) having the third harmonic component of Band 17.

Accordingly, the flow of the third harmonic component of Band 17 into the reception path for Band 4 via the transmission signal path 48 can be reduced without necessarily requiring switching operations at the timing when the transmission signal path 48 for GSM_HB is used in a transmission operation and at the timing when the transmission signal path 48 for GSM_HB is not used in a transmission operation. Thus, the circuit is simplified.

The switch element or filter element included in the front-end module 1 according to this embodiment is not necessarily disposed between the antenna switch module 12 and the power amplifier module 2.

Figure 5:
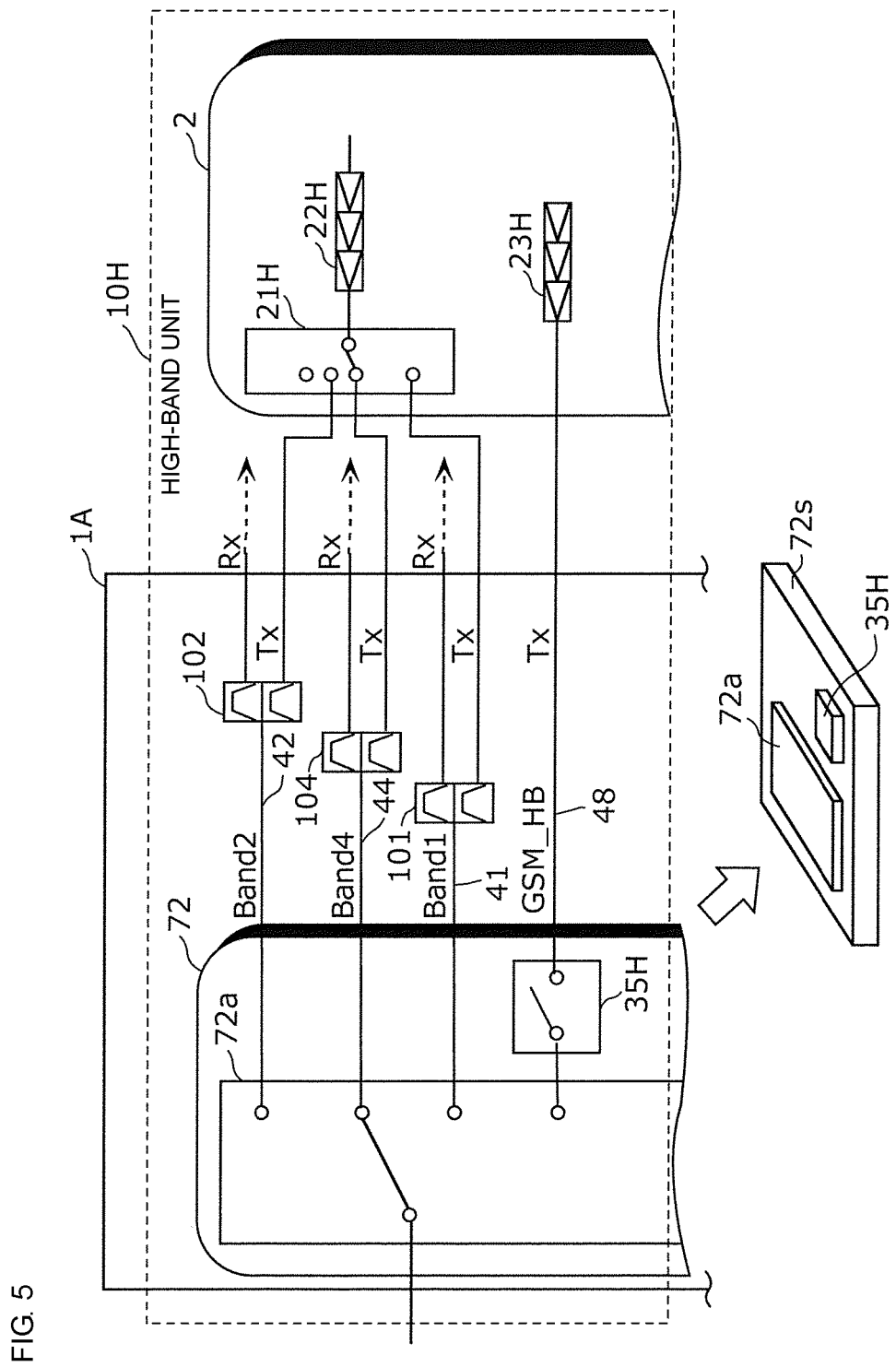
FIG. 5 is a circuit configuration diagram of a front-end module according to Modification 4.

FIG. 5 is a circuit configuration diagram of a front-end module 1A according to Modification 4 of the embodiment. The front-end module 1A according to this modification includes an antenna switch module 72, and includes, as constituent elements of the high-band unit 10H, the signal path 41 for Band 1, the signal path 42 for Band 2, the signal path 44 for Band 4, the transmission signal path 48 for GSM_HB, a switch element 35H, and the duplexers 101, 102, and 104.

The antenna switch module 72 includes a first substrate 72s and a radio-frequency switch circuit chip 72a. The first substrate 72s is, for example, a radio-frequency printed circuit board. The radio-frequency switch circuit chip 72a is formed as, for example, a die having a single-pole multiple-throw switch circuit. In the configuration described above, the switch element 35H is formed as a separate chip from the radio-frequency switch circuit chip 72a on the first substrate 72s. The switch element 35H has one terminal connected to the transmission signal path 48 for GSM_HB via wiring on the first substrate 72s, and another terminal connected to the radio-frequency switch circuit chip 72a via wiring on the first substrate 72s. In this connection configuration, no continuity is established between the one terminal and the other terminal in a mode in which GSM_HB is not used in a transmission operation, and continuity is established between the one terminal and the other terminal in a mode in which GSM_HB is used in a transmission operation.

Accordingly, the third harmonic component that moves into the transmission signal path 48 during CA operation can be prevented from reaching the antenna switch module 72 via the transmission signal path 48. Thus, it is possible to suppress the flow of the third harmonic component of Band 17 into the reception signal path for Band 4. In addition, the radio-frequency switch circuit chip 72a and the switch element 35H are disposed on the same substrate, which can contribute to reduced space that a front-end area including the front-end module 1A takes up. Furthermore, the radio-frequency switch circuit chip 72a and the switch element 35H are formed as separate chips, which enables enhanced isolation characteristics between them.

The switch element 35H may be a switch element that switches between the pass-through state and the short-circuit state of the transmission signal path 48.

Alternatively, the switch element 35H may be a low-pass filter (or a band pass filter) or a band-stop filter that allows a transmission signal of GSM_HB (1710 to 1910 MHz) to pass therethrough and that attenuates the third harmonic component of Band 17 (2112 to 2148 MHz).

Figure 6:
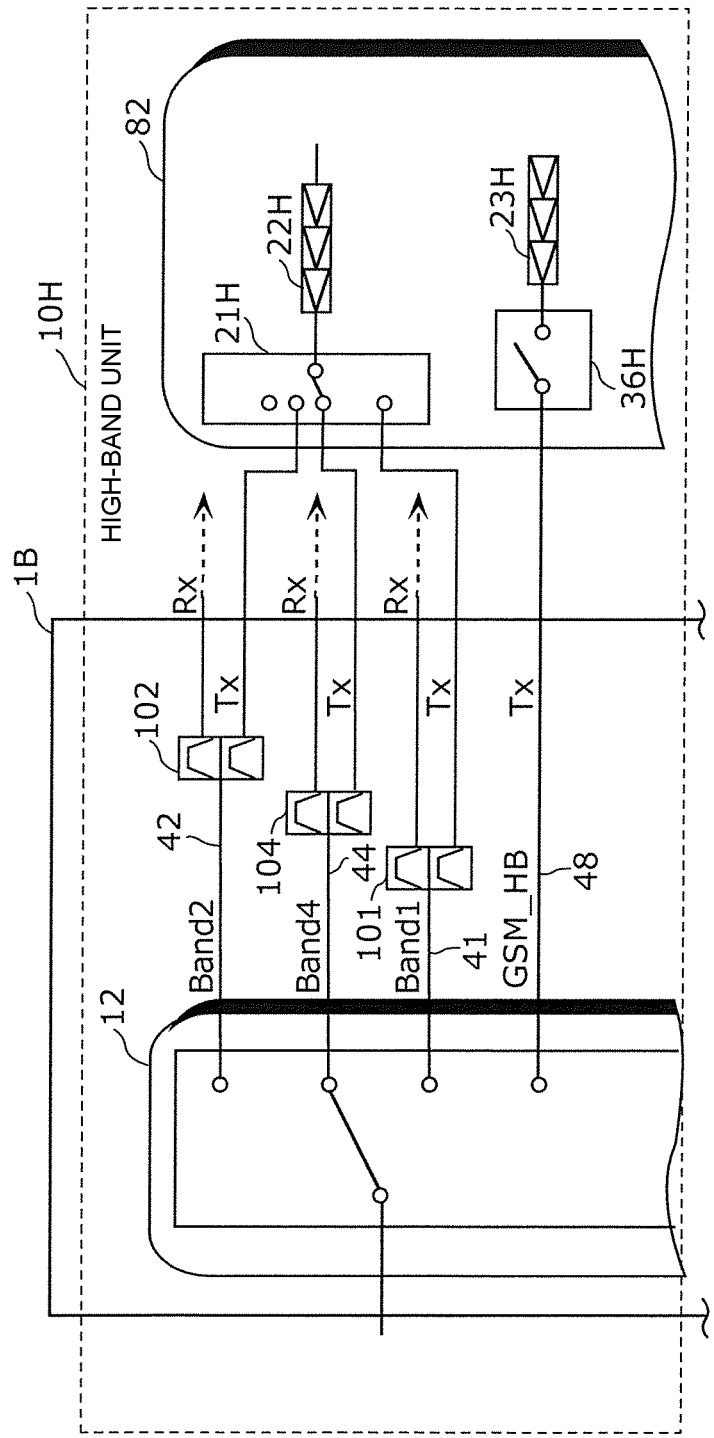
FIG. 6 is a circuit configuration diagram of a front-end module according to Modification 5.

FIG. 6 is a circuit configuration diagram of a front-end module 1B according to Modification 5 of the embodiment. The front-end module 1B according to this modification includes the antenna switch module 12, and includes, as constituent elements of the high-band unit 10H, the signal path 41 for Band 1, the signal path 42 for Band 2, the signal path 44 for Band 4, the transmission signal path 48 for GSM_HB, a switch element 36H, and the duplexers 101, 102, and 104.

A power amplifier module 82 includes a second substrate and a power amplifier circuit chip. The second substrate is, for example, a radio-frequency printed circuit board. The power amplifier circuit chip forms a power amplifier 23H illustrated in FIG. 6, for example. In the configuration described above, the switch element 36H is formed as a separate chip from the power amplifier circuit chip on the second substrate. The switch element 36H has one terminal connected to the transmission signal path 48 for GSM_HB via wiring on the second substrate, and another terminal connected to the power amplifier circuit chip via wiring on the second substrate. In this connection configuration, no continuity is established between the one terminal and the other terminal in a mode in which GSM_HB is not used in a transmission operation, and continuity is established between the one terminal and the other terminal in a mode in which GSM_HB is used in a transmission operation.

Accordingly, the third harmonic component of Band 17 that moves into the transmission signal path 48 in the power amplifier module 82 during CA operation can be prevented from reaching the antenna switch module 12 via the transmission signal path 48. Thus, it is possible to suppress the flow of the third harmonic component into the reception signal path for Band 4. In addition, the power amplifier circuit chip and the switch element 36H are disposed on the same substrate, which can contribute to reduced space that a front-end area including the front-end module 1B takes up. Furthermore, the power amplifier circuit chip and the switch element 36H are formed as separate chips, which enables enhanced isolation characteristics between them.

The switch element 36H may be a switch element that switches between the pass-through state and the short-circuit state of the transmission signal path 48.

Alternatively, the switch element 36H may be a low-pass filter (or a band pass filter) or a band-stop filter that allows a transmission signal of GSM_HB (1710 to 1910 MHz) to pass therethrough and that attenuates the third harmonic component of Band 17 (2112 to 2148 MHz).

The front-end module 1B according to this modification may further include the power amplifier module 82. The power amplifier module 82 is included in the front-end module 1B to form a single unit. With this configuration, a switch element or filter element to be disposed in the transmission signal path 48 can be optimized after being matched to the characteristics of power amplifiers that amplify transmission signals of the respective frequency bands. Thus, the reduction in reception sensitivity of Band 4 can be more effectively suppressed.

[2.4 Modifications of Configuration of Front-End Module]

Figure 7:
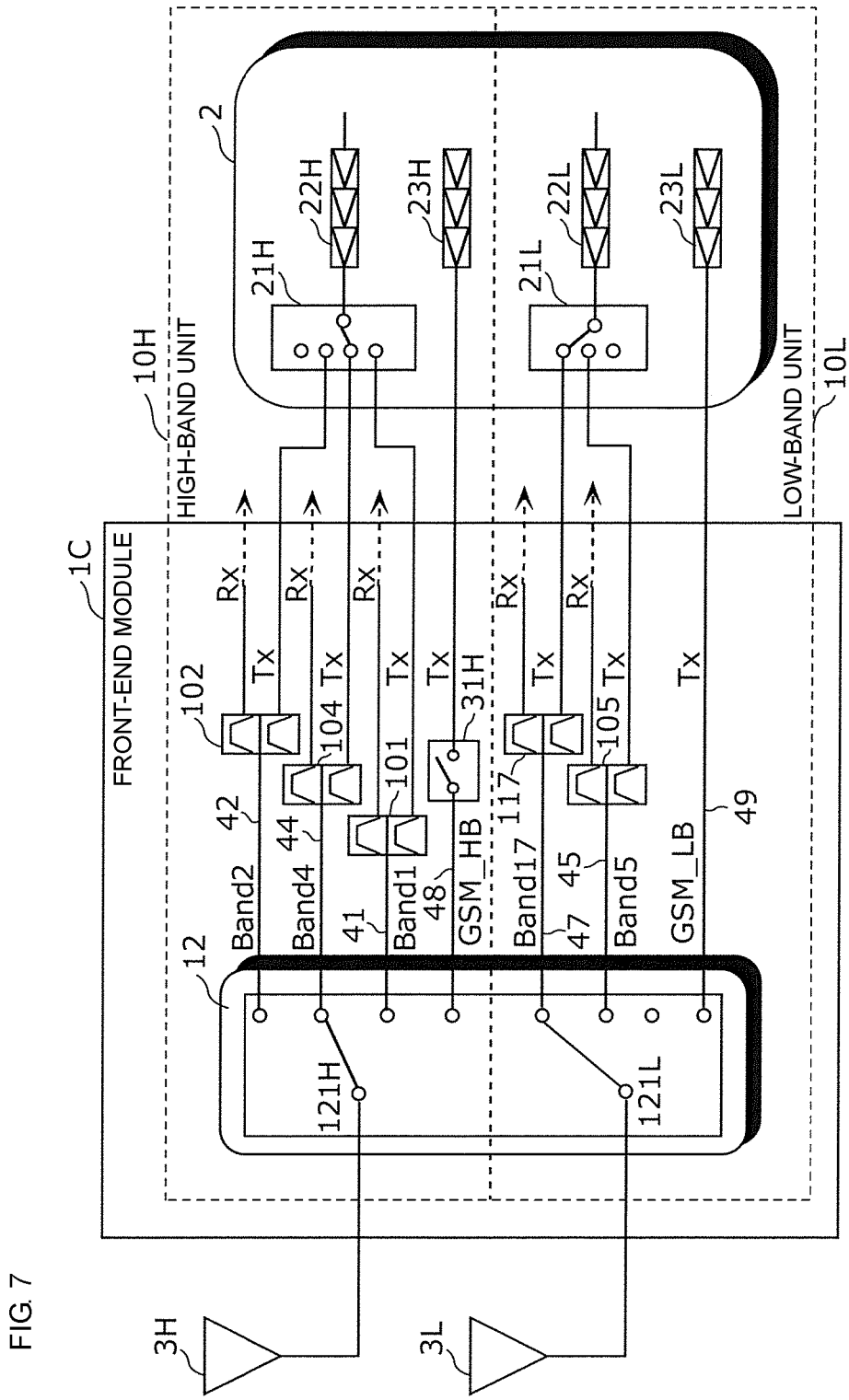
FIG. 7 is a circuit configuration diagram of a front-end module according to Modification 6.

FIG. 7 is a circuit configuration diagram of a front-end module according to Modification 6 of the embodiment. This modification describes a configuration in which the high-band unit 10H and the low-band unit 10L do not share an antenna element but are respectively provided with dedicated antenna elements 3H and 3L. As illustrated in FIG. 7, a front-end module 1C according to this modification includes the antenna switch module 12, the signal paths 41, 42, 44, 45, and 47 for Bands 1, 2, 4, 5, and 17, the transmission signal path 48 for GSM_HB, the transmission signal path 49 for GSM_LB, the switch element 31H, and the duplexers 101, 102, 104, 105, and 117. The front-end module 1C according to this modification has a configuration different from that of the front-end module 1 according to the example implementation only in that the front-end module 1C according to this modification does not include the diplexer 11. The high-frequency input terminal 121H of the antenna switch module 12 is connected to the antenna element 3H, which is capable of selectively receiving and transmitting a frequency band (1.7 to 2.2 GHz) belonging to the high-frequency band group. The low-frequency input terminal 121L of the antenna switch module 12 is connected to the antenna element 3L, which is capable of selectively receiving and transmitting a frequency band (700 MHz to 1 GHz) belonging to the low-frequency band group. This connection configuration eliminates the need for the front-end module 1C to include a diplexer having a function of splitting radio signals into high-frequency band signals and low-frequency band signals.

The frequency bands used in the front-end module according to this embodiment are not limited to a combination of frequency bands exemplarily illustrated in the example implementation. The front-end module according to this embodiment has features that (1) a first frequency band selected from a low-frequency band group and a second frequency band selected from a high-frequency band group are used in a carrier aggregation operation, (2) harmonic components of the first frequency band have frequencies that are included in the second frequency band, and (3) a switch element or a filter element is disposed in a TDD transmission signal path along which signals are transmitted using a TDD scheme among frequency bands other than the first frequency band and the second frequency band to block propagation of the harmonic components. That is, the front-end module according to this embodiment may have any combination of frequency bands so long as the front-end module has a configuration having the features (1), (2), and (3).

Figure 8:
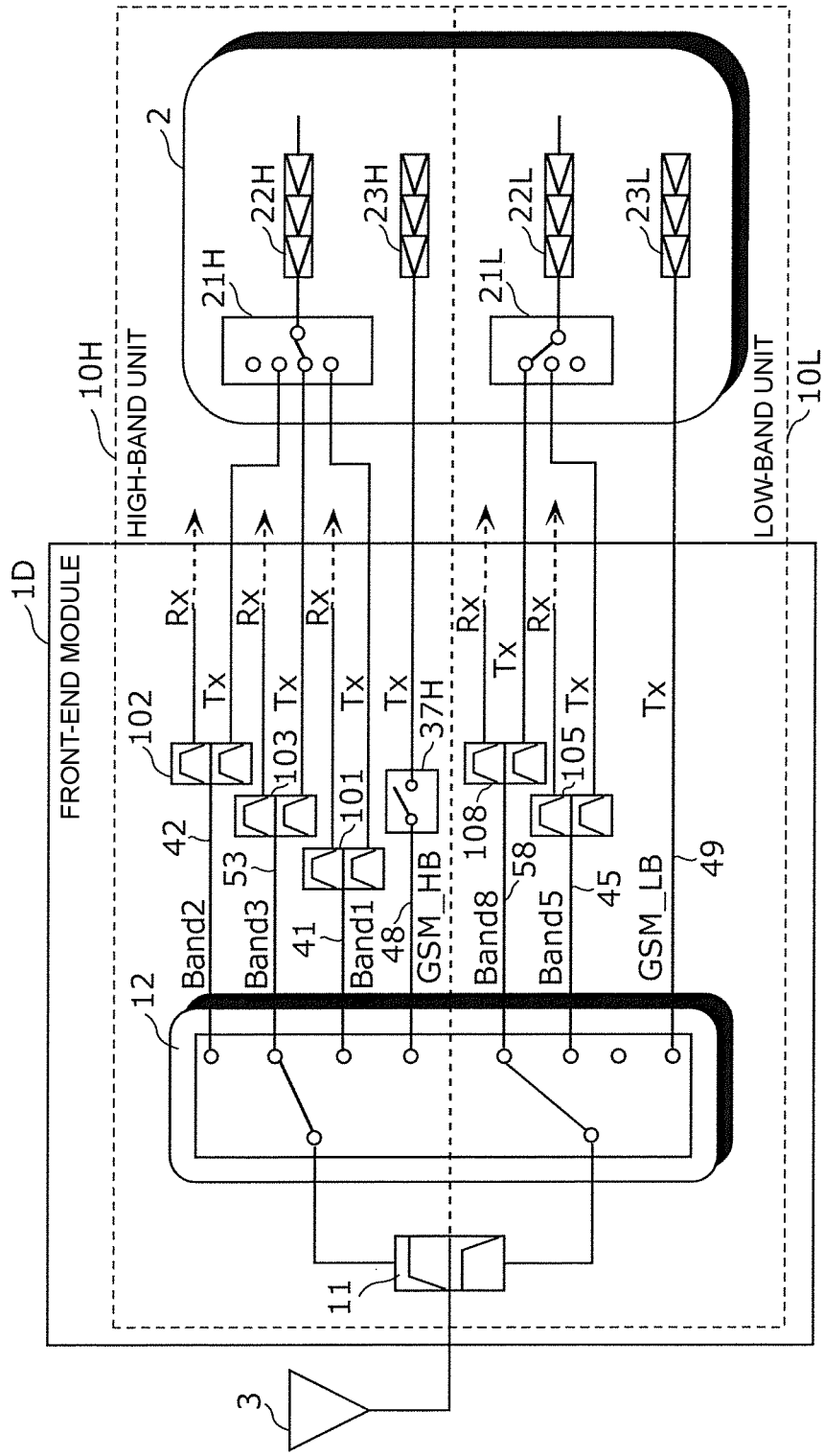
FIG. 8 is a circuit configuration diagram of a front-end module according to Modification 7.

FIG. 8 is a circuit configuration diagram of a front-end module 1D according to Modification 7 of the embodiment.

The front-end module 1D according to Modification 7 includes the diplexer 11, the antenna switch module 12, the signal path 41 for selectively propagating a signal of Band 1 (transmission band: 1920 to 1980 MHz, reception band: 2110 to 2170 MHz) conforming to the LTE standard, the signal path 42 for selectively propagating a signal of Band 2 (transmission band: 1850 to 1910 MHz, reception band: 1930 to 1990 MHz) conforming to the LTE standard, a signal path 53 for selectively propagating a signal of Band 3 (transmission band: 1710 to 1785 MHz, reception band: 1805 to 1880 MHz) conforming to the LTE standard, a signal path 58 for selectively propagating a signal of Band 8 (transmission band: 880 to 915 MHz, reception band: 925 to 960 MHz) conforming to the LTE standard, the signal path 45 for selectively propagating a signal of Band 5 (transmission band: 824 to 849 MHz, reception band: 869 to 894 MHz) conforming to the LTE standard, the transmission signal path 48 for selectively propagating a transmission signal of GSM_HB (transmission band: 1710 to 1910 MHz), the transmission signal path 49 for selectively propagating a transmission signal of GSM_LB (transmission band: 824 to 915 MHz), a switch element 37H, and the duplexers 101, 102, 103, 105, and 108.

Here, the front-end module 1D according to this modification adopts the so-called carrier aggregation scheme, in which different frequency bands are used simultaneously, for the purpose of improved communication quality. More specifically, in this modification, Band 3 belonging to the high-frequency band group and Band 8 belonging to the low-frequency band group are used simultaneously.

The switch element 37H is disposed in the transmission signal path 48 for GSM_HB, which is a TDD transmission path. The switch element 37H has one terminal connected to the transmission signal path 48 on the power amplifier module 2 side, and another terminal connected to the transmission signal path 48 on the antenna switch module 12 side. In this connection configuration, no continuity is established between the one terminal and the other terminal in a mode in which GSM_HB is not used in a transmission operation, and continuity is established between the one terminal and the other terminal in a mode in which GSM_HB is used in a transmission operation.

In this modification, the second harmonic component of a transmission signal (880 to 915 MHz) of Band 8 (first frequency band) has a frequency that is included in the reception band (1805 to 1880 MHz) for Band 3 (second frequency band). Due to this frequency relationship, the second harmonic component of the transmission signal of Band 8, which has been generated in the power amplifier 22L and the radio-frequency switch 21L, can move to the transmission signal path 48 for GSM_HB within or near the power amplifier module 2.

However, the front-end module 1D according to this modification is provided with the switch element 37H in the transmission signal path 48 to block the second harmonic component. The switch element 37H is in the open state in the mode in which GSM_HB is not used in a transmission operation, in other words, in a mode in which Bands 3 and 8 are used in a CA operation. This can prevent the second harmonic component that moves into the transmission signal path 48 from reaching the antenna switch module 12 via the transmission signal path 48. Thus, it is possible to suppress the flow of the second harmonic component into the reception signal path for Band 3.

(3. Other Modifications, etc.)

While a front-end module according to an embodiment of the present disclosure has been described in conjunction with an example implementation and modifications, front-end modules of the present disclosure are not limited to those according to the example implementation and modifications described above. Other embodiments achieved by combining arbitrary constituent elements in the example implementation and modifications described above, modifications obtained by applying various modifications conceivable by a person skilled in the art without departing from the gist of the present disclosure to the example implementation and modifications described above, and various devices including the front-end modules disclosed herein are also encompassed by the present disclosure.

In the modifications of the embodiment described above, a switch element or filter element that blocks harmonic components is disposed in a TDD transmission path (GSM_HB) belonging to the high-frequency band group, by way of example, but not by limitation. The switch element or filter element may be disposed in a TDD transmission path (GSM_LB) belonging to the low-frequency band group.

Accordingly, in carrier aggregation in which signals of a first frequency band and a second frequency band are communicated simultaneously, when a transmission signal of the first frequency band is transmitted, the flow of a harmonic component of the transmission signal into a reception path for the second frequency band via a TDD transmission path can be reduced. Thus, the reduction in reception sensitivity for the second frequency band can be suppressed.

Additionally, in the front-end modules according to the example implementation and modifications described above, a different radio-frequency circuit element, wiring, and so on may be inserted between the paths connecting the circuit elements and the signal paths disclosed in the drawings.

INDUSTRIAL APPLICABILITY

The present disclosure provides a multi-band/multi-mode front-end module that uses a carrier aggregation scheme, and is widely applicable to communication devices such as cellular phones.

REFERENCE SIGNS LIST 1, 1A, 1B, 1C, 1D, 501 front-end module
2, 82, 502 power amplifier module
3, 3H, 3L, 503 antenna element
10H, 510H high-band unit
10L, 510L low-band unit
11, 511 diplexer
12, 72, 512 antenna switch module
21H, 21L, 521H, 521L radio-frequency switch
22H, 22L, 23H, 23L, 522H, 522L, 523H, 523L power amplifier
31H, 32H, 35H, 36H, 37H switch element
33H, 34H filter element
41, 42, 44, 45, 47, 53, 58, 531, 532, 534, 537, 551 signal path
48, 49, 535H, 535L transmission signal path
72a radio-frequency switch circuit chip
72s first substrate
101, 102, 103, 104, 105, 108, 117, 504, 517 duplexer
121, 122, 124, 125, 127, 128, 129 output terminal
121H high-frequency input terminal
121L low-frequency input terminal

The invention claimed is:

1. A front-end module configured to use a carrier aggregation scheme in which a first frequency band of a first group and a second frequency band of a second group are used in simultaneous communication, the second group being in a higher frequency region than the first group, the front-end module comprising:
a plurality of signal paths that connect an amplifier circuit to an antenna, each of the plurality of signal paths being configured to selectively propagate a signal of a corresponding frequency band, the plurality of signal paths including at least a time division multiple access (TDMA) signal path configured to propagate a signal according to a TDMA scheme, a signal path configured to propagate a signal of the first frequency band, and a signal path configured to propagate a signal of the second frequency band; and
an antenna switch configured to switch connection between the antenna and at least one of the plurality of signal paths,
a switch or filter disposed in a receiving path of the TDMA signal path and connected between the amplifier circuit and the antenna switch, the switch or filter being configured to block a frequency component corresponding to a harmonic of a transmission signal of the first frequency band during the carrier aggregation scheme, wherein the harmonic of the transmission signal of the first frequency band has a frequency that is within the second frequency band.

2. The front-end module according to claim 1, wherein the TDMA signal path is configured to propagate a signal of a frequency band in the second group.

3. The front-end module according to claim 1, wherein
the signal path configured to selectively propagate the signal of the first frequency band and the signal path configured to selectively propagate the signal of the second frequency band are configured to propagate the respective signals according to a frequency division duplex (FDD) scheme.

4. The front-end module according to claim 1, wherein
the switch is disposed in the TDMA signal path, and
when the antenna is not connected to the TDMA signal path by the antenna switch, the switch is configured to form an open circuit in the TDMA signal path.

5. The front-end module according to claim 1, wherein
the switch is disposed in the TDMA signal path, and
when the antenna is not connected to the TDMA signal path by the antenna switch,
the switch is configured to form a short-circuit to ground in the TDMA signal path.

6. The front-end module according to claim 1, wherein
the filter is disposed in the TDMA signal path, and
the filter is a low-pass filter configured to pass a transmission wave used in the TDMA scheme and to attenuate a signal having the frequency component corresponding to the harmonic of the transmission signal of the first frequency band.

7. The front-end module according to claim 1, wherein
the filter is disposed in the TDMA signal path, and
the filter is a band-stop filter configured to pass a transmission wave used in the TDMA scheme and to attenuate a signal having the frequency component corresponding to the harmonic of the transmission signal of the first frequency band.

8. The front-end module according to claim 1, further comprising:
the amplifier circuit, the amplifier circuit being configured to amplify a signal whose transmission carrier wave lies in either the first group or the second group.

9. The front-end module according to claim 1, wherein the antenna switch comprises:
a substrate, and
a radio-frequency switch circuit chip on the substrate that is configured to switch connection between the antenna and the plurality of signal paths, and
the switch or filter is formed as a separate chip from the radio-frequency switch circuit chip on the substrate.

10. The front-end module according to claim 1, wherein the amplifier circuit comprises:
a substrate, and
a power amplifier circuit chip on the substrate that is configured to amplify a transmission wave, and
the switch or filter is formed as a separate chip from the power amplifier circuit chip on the substrate.

11. The front-end module according to claim 1, wherein
the first frequency band is Band 17 having a transmission pass band of 704 to 716 MHz and conforming to an LTE standard,
the second frequency band is Band 4 having a reception pass band of 2110 to 2155 MHz and conforming to the LTE standard,
the TDMA scheme is a Global System for Mobile communication (GSM) scheme,
the TDMA signal path is configured to propagate a transmission signal of GSM_HB having a transmission pass band of 1710 to 1910 MHz, and
a third harmonic of a transmission signal of the first frequency band has a frequency that substantially matches a frequency of a reception signal of the second frequency band.

12. The front-end module according to claim 1, wherein
the first frequency band is Band 8 having a transmission pass band of 925 to 960 MHz and conforming to an LTE standard,
the second frequency band is Band 3 having a reception pass band of 1710 to 1785 MHz and conforming to the LTE standard,
the DD TDMA scheme is a Global System for Mobile communication (GSM) scheme,
the TDMA signal path is configured to propagate a transmission signal of GSM_HB having a transmission pass band of 1710 to 1910 MHz, and
a third harmonic of a transmission signal of the first frequency band has a frequency that substantially matches a frequency of a reception signal of the second frequency band.

* * * * *

UNITED STATES PATENT AND TRADEMARK OFFICE
CERTIFICATE OF CORRECTION

PATENT NO. : 10,886,951 B2
APPLICATION NO. : 15/871662
DATED : January 5, 2021
INVENTOR(S) : Shoji Nagumo et al.

Page 1 of 1

It is certified that error appears in the above-identified patent and that said Letters Patent is hereby corrected as shown below:

In the Specification

Column 9, Line 66, "(SPOT)" should be -- (SP4T) --.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*